US011168869B2

(12) United States Patent
Pet et al.

(10) Patent No.: US 11,168,869 B2
(45) Date of Patent: Nov. 9, 2021

(54) LIGHTING DEVICE AND LIGHTING SYSTEM

(71) Applicant: PHILIPS LIGHTING HOLDING B.V., Eindhoven (NL)

(72) Inventors: Robert Pet, Eindhoven (NL); Oliver Dross, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 689 days.

(21) Appl. No.: 15/528,531

(22) PCT Filed: Nov. 22, 2015

(86) PCT No.: PCT/EP2015/077296
§ 371 (c)(1),
(2) Date: May 22, 2017

(87) PCT Pub. No.: WO2016/083274
PCT Pub. Date: Jun. 2, 2016

(65) Prior Publication Data
US 2017/0268749 A1    Sep. 21, 2017

(30) Foreign Application Priority Data

Nov. 24, 2014 (EP) ..................... 14194500

(51) Int. Cl.
| F21S 10/00 | (2006.01) |
| F21V 14/06 | (2006.01) |
| F21V 5/00 | (2018.01) |
| G02B 26/08 | (2006.01) |
| G02B 19/00 | (2006.01) |

(Continued)

(52) U.S. Cl.
CPC ............ *F21V 14/06* (2013.01); *F21S 10/005* (2013.01); *F21S 10/007* (2013.01); *F21V 5/002* (2013.01);
(Continued)

(58) Field of Classification Search
CPC ............ G02B 19/0014; G02B 19/0066; G02B 26/0875; G02B 19/0883; G02B 19/108;
(Continued)

(56) References Cited

U.S. PATENT DOCUMENTS

| 4,118,109 A | 10/1978 | Crawford et al. |
| 6,502,956 B1 | 1/2003 | Wu |
| 6,636,664 B2 * | 10/2003 | Snyder ................. G02B 6/3524 385/115 |

(Continued)

FOREIGN PATENT DOCUMENTS

| CN | 101918759 A | 12/2010 |
| CN | 102844613 A | 12/2012 |

(Continued)

*Primary Examiner* — Arman B Fallahkhair
(74) *Attorney, Agent, or Firm* — Daniel J. Piotrowski (57) ABSTRACT

A lighting device comprises a light source defining a central axis and comprising at least two mutually independently operable lighting elements. The lighting device further comprises a rotatable deflective member rotatably mounted about said axis, and a fixed deflective member fixedly mounted on said axis and comprising at least two mutually differently deflective portions which each are associated with a respective lighting element. The lighting device of the invention enables various operation modes, like light beam rotation can rotate, jumping of the light beam from one location to another by a sequence of switching on and off one or more of the at least two lighting elements, or in that (Continued)

it can be dimmed or boosted, for example dimmable in steps by a sequence of one by one switching off the lighting elements.

15 Claims, 8 Drawing Sheets (51) Int. Cl.
*G02B 26/10* (2006.01)
*G02B 5/04* (2006.01)
*G02B 26/12* (2006.01)
*F21Y 115/10* (2016.01)

(52) U.S. Cl.
CPC ......... *G02B 5/045* (2013.01); *G02B 19/0014* (2013.01); *G02B 19/0066* (2013.01); *G02B 26/0875* (2013.01); *G02B 26/0883* (2013.01); *G02B 26/108* (2013.01); *G02B 26/123* (2013.01); *F21S 10/00* (2013.01); *F21V 5/007* (2013.01); *F21Y 2115/10* (2016.08); *G02B 26/10* (2013.01); *G02B 26/12* (2013.01)

(58) Field of Classification Search
CPC ...... G02B 19/123; G02B 19/10; G02B 19/12; F21S 10/005; F21S 10/007; F21S 10/00; F21V 14/06; F21V 5/00; F21V 5/007; F21V 5/002; F21V 5/045
See application file for complete search history.

(56) References Cited

U.S. PATENT DOCUMENTS

| | | | | |
|---|---|---|---|---|
| 7,033,037 | B2* | 4/2006 | Chen | F21S 10/00 |
| | | | | 362/104 |
| 7,217,002 | B2* | 5/2007 | Jungel-Schmid | F21S 8/02 |
| | | | | 362/147 |
| 8,007,134 | B2* | 8/2011 | Allegri | F21S 10/007 |
| | | | | 362/282 |
| 9,732,942 | B2* | 8/2017 | Jorgensen | F21V 14/02 |
| 2005/0225763 | A1 | 10/2005 | Rehm et al. | |
| 2007/0097681 | A1* | 5/2007 | Chich | F21S 10/00 |
| | | | | 362/232 |
| 2009/0168425 | A1 | 7/2009 | Chuang | |
| 2011/0280018 | A1* | 11/2011 | Vissenberg | G02B 3/005 |
| | | | | 362/277 |
| 2013/0322090 | A1 | 12/2013 | Pijlman et al. | |

FOREIGN PATENT DOCUMENTS

| | | |
|---|---|---|
| CN | 102997119 A | 3/2013 |
| CN | 203560817 U | 4/2014 |
| CN | 104141925 A | 11/2014 |
| DE | 202005001704 U1 | 5/2005 |
| DE | 102009060565 A1 | 6/2011 |
| JP | 6365578 A | 3/1988 |
| WO | 2010041182 A1 | 4/2010 |
| WO | 2012032436 A1 | 3/2012 |
| WO | 2013142436 A1 | 9/2013 |
| WO | 2013179186 A1 | 12/2013 |

* cited by examiner

FIG. 1

(Prior art)

LIGHTING DEVICE AND LIGHTING SYSTEM

CROSS-REFERENCE TO PRIOR APPLICATIONS

This application is the U.S. National Phase application under 35 U.S.C. § 371 of International Application No. PCT/EP2015/077296, filed on Nov. 22, 2015 which claims the benefit of European Patent Application No. 14194500.6, filed on Nov. 24, 2014. These applications are hereby incorporated by reference herein.

FIELD OF THE INVENTION

The invention relates to a lighting device comprising a rotatable deflective member and to a lighting system comprising such a lighting device and a control unit.

BACKGROUND OF THE INVENTION

Lighting devices and lighting systems that, instead of using movable light sources to steer the light beam, use rotatably optically active members for directing a light beam to a desired location are known in the art. For example U.S. Pat. No. 4,118,109 discloses a lighting device comprising two refractive prisms rotatable about a common axis. The known lighting device further comprises a control circuit to cause the prisms to assume the appropriate positions. To enable the beam to be directable in any azimuth angle around the axis and enabling a variable polar angle, the two refractive prisms in the known lighting device are mutually independently rotatable about said axis. However, this resulted in the known lighting device of having the disadvantage that it comprises a relatively complex and expensive mechanical construction to enable said mutually independent rotation.

Furthermore, in the present lighting market general specifications lighting devices are desired that offer a versatile range of dynamic lighting possibilities. Another disadvantage of the known lighting device is that it is not up to standards with respect to these specifications as it is relatively limited in its versatility, for example in that it is limited in its dynamic light intensity possibility to only switching the light beam on and off.

DE10 2009 060 565 A1 discloses a lighting device with a light source comprising different groups of LEDs which comprise in front deflecting lenses, and which are operated independently using a controller to produce different lighting conditions in cooperation with a deflective element rotatable about an axis.

SUMMARY OF THE INVENTION

It is an object of the invention to provide a lighting device of the type as mentioned in the opening paragraph in which at least one of the abovementioned disadvantages is counteracted. Thereto the lighting device according to the invention comprises a light source comprising at least two mutually independently operable lighting elements arranged around a central axis; a fixed deflective member fixedly mounted on said axis and facing the light source and comprising at least two portions which mutually are different in deflection structure and/or orientation of the deflection structure and which each are associated with a respective lighting element; a rotatable deflective member rotatably mounted about said axis and facing the fixed deflective member, wherein the fixed deflective member is positioned in between the light source and the rotatable deflective member, and wherein a main surface of the fixed deflective member comprises concentric ring shaped deflective portions. The deflective members and deflective portions can deflect light via refraction and/or reflection and/or TIR.

The ring shaped deflection portions fully cover the main surface of the fixed deflective member and hence there are no open spots in its surface area that are not used for deflection of light into the desired direction. Hence, spill light is counteracted in this way. An alternative subdivision of the main surface of the fixed deflective member is that the main surface of the fixed deflective member comprises concentric ring shaped deflective portions, and with the surface area preferably equal in size for each ring shaped portions.

The lighting device of the invention enables various operation modes for the collimation of light by the combined operation of operable lighting elements of the fixed refraction member with the collimator formed by the associated deflective portion and the rotatable refraction member. For example, the light beam can rotate, and/or can jump from one location to another by a sequence of switching on and off one or more of the at least two lighting elements, and in that it can be dimmed or boosted, for example gradually dimmable or dimmable in at least three steps or dimmable by a sequence of one by one switching off the lighting elements. The number of operation modes increases with increasing numbers of lighting elements and/or differently deflective portions. It is convenient for the lighting elements to be embodied as LEDs and the description of the invention will mostly be described at the hand of LEDs, however when LEDs are mentioned in the description this implicitly means lighting elements in general, like compact light sources as halogen lamps, short arc HID lamps. The number of lighting elements and deflective portions can range from 2 to 100, or even up to 1000, for example 4, 8, 12, 50, 120, 200. Furthermore the lighting device enables a change in beam pattern via control of the number of lighting elements that are simultaneously in operation. Thereto an embodiment of the lighting device is characterized in that at least two of the lighting elements are simultaneously operable, but this can also be for example 3, 6, 10, 20, 75, 150. With an increasing number of simultaneously operable lighting elements and associated deflective portions it is enabled to generate more complex and dedicated dynamic beam patterns, for example a batwing beam pattern, or a double batwing pattern, i.e. a beam pattern having four lobes when four lighting elements with four associated refraction portions are simultaneously in operation.

Each lighting element preferably comprises at least one LED, for example one, two, three, four, six or fifteen LEDs, depending on the desired light output, although other types of easily dimmable and/or instantaneously switchable light sources, such as miniature halogen lamps, are also attractive light sources. The lighting device of the invention has an abundance of lighting elements to enable the desired effects, and the compactness of the lighting device enabled by LEDs is very convenient. Yet, in view of the trends in cost-price of LEDs in the direction of "LEDs for free", the abundance of LEDs has no significant effect on the overall cost-price of the lighting device. In particular LEDs offer the possibility of easy immediate on/off switching, dimming or boosting. Furthermore, if the LEDs are composed of RGB optionally with W and/or A LED sources (RGBWA stands for Red, Green, Blue, White and Amber), also dynamic color and color pattern variations are enabled by selective operation of any of the RGBWA LED sources.

Furthermore to further improve the functionality of the lighting device, the light as issued from the lighting element preferably is issued as a parallel beam of light. Thereto, it is convenient for the lighting element to have an integrated collimating element, for example a bowl-shaped TIR collimator lens, or that the lighting elements share a plate with collimators. Optionally such a collimator can comprise a deflective portion at its top surface, which then can be considered as the substitute for the associated deflective portion of the fixed deflective member. In such an embodiment of the lighting elements with integrated collimator and integrated deflective portion, the fixed deflective member is considered as being present in the lighting device as an integrated part of the lighting elements/light source.

With increasing number of rings shaped deflective portions the versatility of dynamic lighting possibilities is increased as the number of directions into which said incident light can be directed is increased by each ring. Therefore, the number of rings preferably is at least four, for example five, eight, nine, sixteen or seventeen. The ring can have a round, circular shape, or can have the shape of a relatively high numbered regular polygon having a shape quite similar to a round circle, for example a hexagon, octagon, decagon or dodecagon.

Because the fixed deflective member is positioned in between the light source and the fixed deflective member, it is thus enabled to position the fixed deflective member directly opposite, close to the light source. Thus easy alignment of the deflective portions with a respective lighting element is enabled, furthermore spill light and the risk of cross-over between adjacent combinations of reactive portions and lighting elements are counteracted. It is further preferable that the rotatable deflective member is positioned close to fixed deflective member, yet without being in optical contact therewith, to further reduce spill light and to enable the manufacture of a relatively compact lighting device. Alternatively it is possible to position the rotatable deflective member in between the light source and the fixed deflective member. However, due to the rotation of the rotatable deflective member deflected light by the rotatable deflective member, for a single lighting element the effect will occur of impingement on a variable location on the fixed deflective member, thus requiring a more complex arrangement of deflective portions on the fixed deflective member. Yet, this effect can be significantly reduced by positioning the fixed deflective member directly adjacent to the rotatable deflective member along the central axis. This effect is generally no issue in the case of the fixed member being positioned in between the light source and the rotatable deflective member, as the refractive structure on a main surface of the rotatable deflective member is in general the same for the whole main surface, though some sub-partition of said surface into two, three or four deflective portions is also possible for making the lighting device even more versatile.

An embodiment of the lighting device is characterized in that fixed deflective member is a single piece extending over all the lighting elements. Thus the number of parts necessary for assembling is reduced and hence a relatively easy assembling of the lighting device is attained.

An embodiment of the lighting device is characterized in that the deflective members each are a refractive member and preferably each member comprise a prismatically shaped main surface, prismatic ridges on the main surface preferably have the same shape, i.e. the same height and the same top angle. The prismatically shaped main surface may face towards the light source, but alternatively may face away from the light source. Many shapes of deflective elements on the main surface are possible, for example, an undulated shaped main surface or a main surface formed by microfacets. An undulated shaped main surface involves gradually changing deflection angles and thus leads to a broad deflected beam, and is favorable if such a broad beam is desired. A microfacet shaped surface is more complex to make, yet offers the advantage that the deflected beam can be given practically any desired shape. Prismatically shaped main surfaces have the advantage that they are relatively easy to manufacture and if the prismatic ridges all have the same shape, at least per deflective portion, the beam of light is deflected over the same angle per deflective portion (assuming that for the whole deflective portion the angle of incidence on said deflective portion is the same). Thus redirection of a narrow beam is enabled.

An embodiment of the lighting device is characterized in that light which incidents parallel to the axis on the fixed deflective member is redirected into a unique direction by a respective deflective portion. Thus the versatility of dynamic lighting possibilities is increased with the number of direction into which said incident light can be directed.

An embodiment of the lighting device is characterized in that the for all the ring shaped deflective portions the number of LEDs associated per ring shaped deflective portion is essentially constant. Then it is easily attained, when switching from LEDs associated with a first ring shaped deflective portion to LEDs associated with another ring shaped deflective portion, that the amount of light issued by the lighting device during operation, can be kept constant. An alternative subdivision of the main surface of the fixed deflective member is that the main surface of the fixed deflective member comprises concentric ring shaped deflective portions, with the surface area equal in size for the ring shaped portions. Then the density of LEDs can be the same for each of the ring shaped deflective portions.

An embodiment of the lighting device is characterized in that each ring has a unique deflection which is the same over the whole ring. A simple circular arrangement of LEDs of lighting elements associated with a respective deflective portion is thus enabled. Furthermore, this renders the lighting device to have a more aesthetic appearance when a person looks directly towards the lighting device. Alternatively an embodiment of the lighting device is characterized in that each ring is built up by deflective ring segments which are mutually different in deflection. Thus it is attained that with a simple circular arrangement of the lighting elements the versatility of dynamic lighting possibilities is increased as the number of directions into which said incident light can be directed is increased per ring.

An embodiment of the lighting device is characterized in that in radial direction over the surface of the fixed deflection member the degree of deflection for the elevation/polar angle has a gradual change, preferably continuously increases or decreases from center to periphery. Smooth radially inward/outward movement of (redirected) dynamic beams is thus enabled, for example, in that the associated lighting elements are sequentially dimmed and boosted in said radial direction.

An embodiment of the lighting device is characterized in that the rotatably deflective member is a round disk with a diameter that is equal or larger than the diameter of a disk shaped fixed deflective member. This enables a convenient, compact, circular cylindrical housing for both deflective members. Frequently at least some of the deflective portions might deflect light away from the axis, and for the rotatable deflective member to intercept said deflected light it is convenient when it is somewhat larger than the fixed deflective member in diameter. Thus the risk on spilled light is reduced.

The invention further relates to a lighting system comprising at least one lighting device according to the invention, and which further comprises a control unit for controlling at least the operable lighting elements. If the lighting system comprises drive means for rotating a motor driven rotatable deflective member, the control unit can also be used for control of said drive means.

An embodiment of the lighting system is characterized in that it further comprises a sensor for providing a sensor signal to the control unit. Such a sensor, for example, can be an occupancy sensor for switching on the lighting device if the presence of a person is detected, or it can be a movement sensor which detects the movement of a person and subsequently sends a sensor signal to the control unit to steer the light beam into said person and to follow with the light beam the path of said person.

An embodiment of the lighting system is characterized in that it comprises at least two lighting devices according to the invention, the at least two lighting devices are controlled by the control unit for mutual cooperation. The at least two lighting devices can then cooperate to render the lighting devices to have an even more versatility of dynamic lighting possibilities over a larger target area as the dynamic behavior of a first lighting device can be taken over/followed by a dynamic behavior of a second or further lighting device. It is also enabled to follow or guide with the light beam the path of said person over extended distances compared to the follow range of a single lighting device.

BRIEF DESCRIPTION OF THE DRAWINGS

The invention will be further elucidated by means of the schematic drawings in which some features may be exaggerated in size/scale for the sake of clarity, and in which.

DESCRIPTION OF EMBODIMENTS

Figure 1:
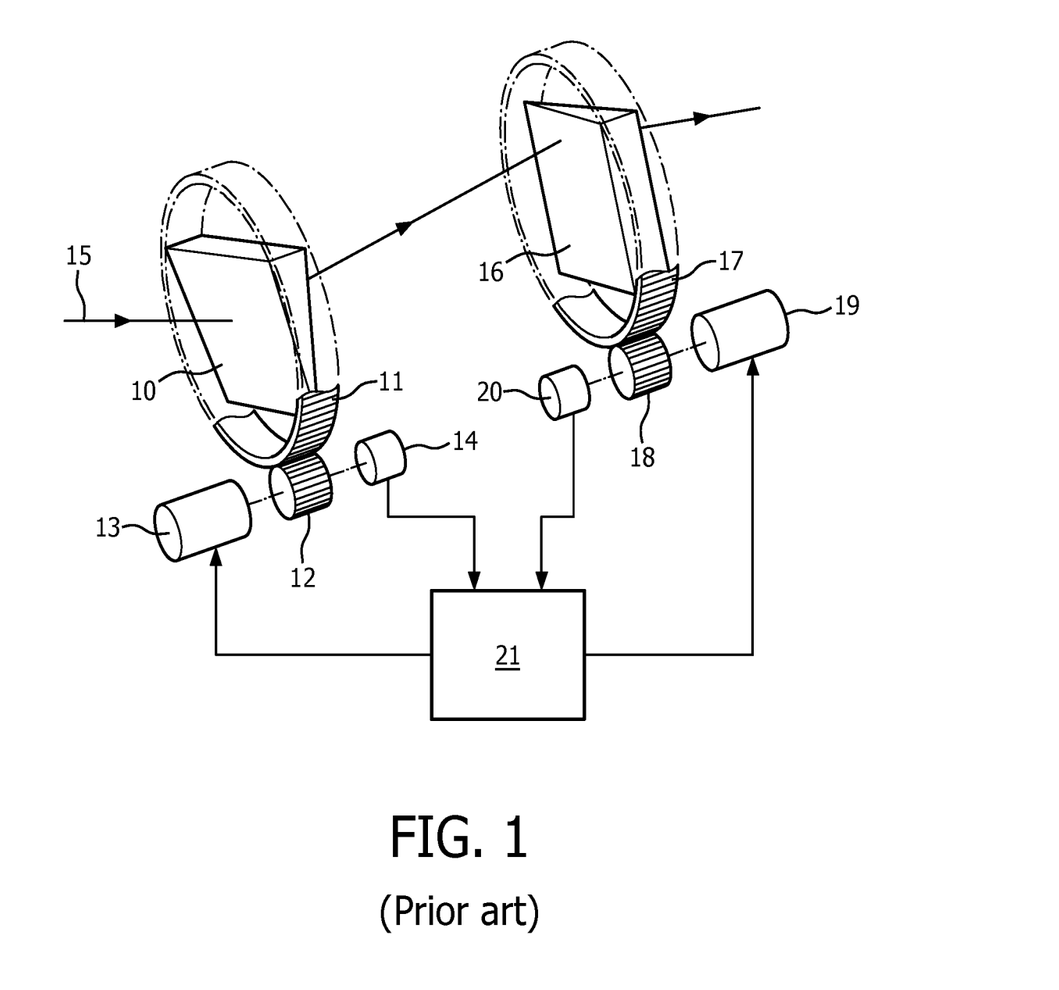
FIG. 1 shows a lighting device according to the prior art.

FIG. 1 shows a lighting device according to the prior art in which a first, rotatable prism 10 is mounted in a carrier 11, part only of which is shown. The carrier is arranged to be rotatable about a central axis 15 and is formed with a toothed gearing for cooperation with a pinion 12. The pinion is connected to a first motor 13 and a synchro resolver 14. A second rotatable prism 16 is located adjacent to the first prism so that it intercepts the beam of radiation leaving the first prism. The planes bisecting the apex angles of prisms 10 and 16 are arranged to be approximately normal to the central axis 15 about which the carriers rotate. The second prism is also mounted in a carrier 17 which is rotatable, and carries a toothed gear ring for engagement with a pinion 18 driven by a second motor 19. A second synchro resolver 20 is also connected to the second drive motor. Rotation of the two prisms about the central axis is possible quite independently of one another, whilst retaining the necessary relationship between the planes of the faces. The two resolvers 14 and 20 are arranged to give output signals which uniquely identify the angular position of the two prisms relative to a reference angular position. The outputs of the two resolvers 14 and 20, and control inputs to the two drive motors 13 and 19 are connected to the control circuitry 21.

Figure 2:
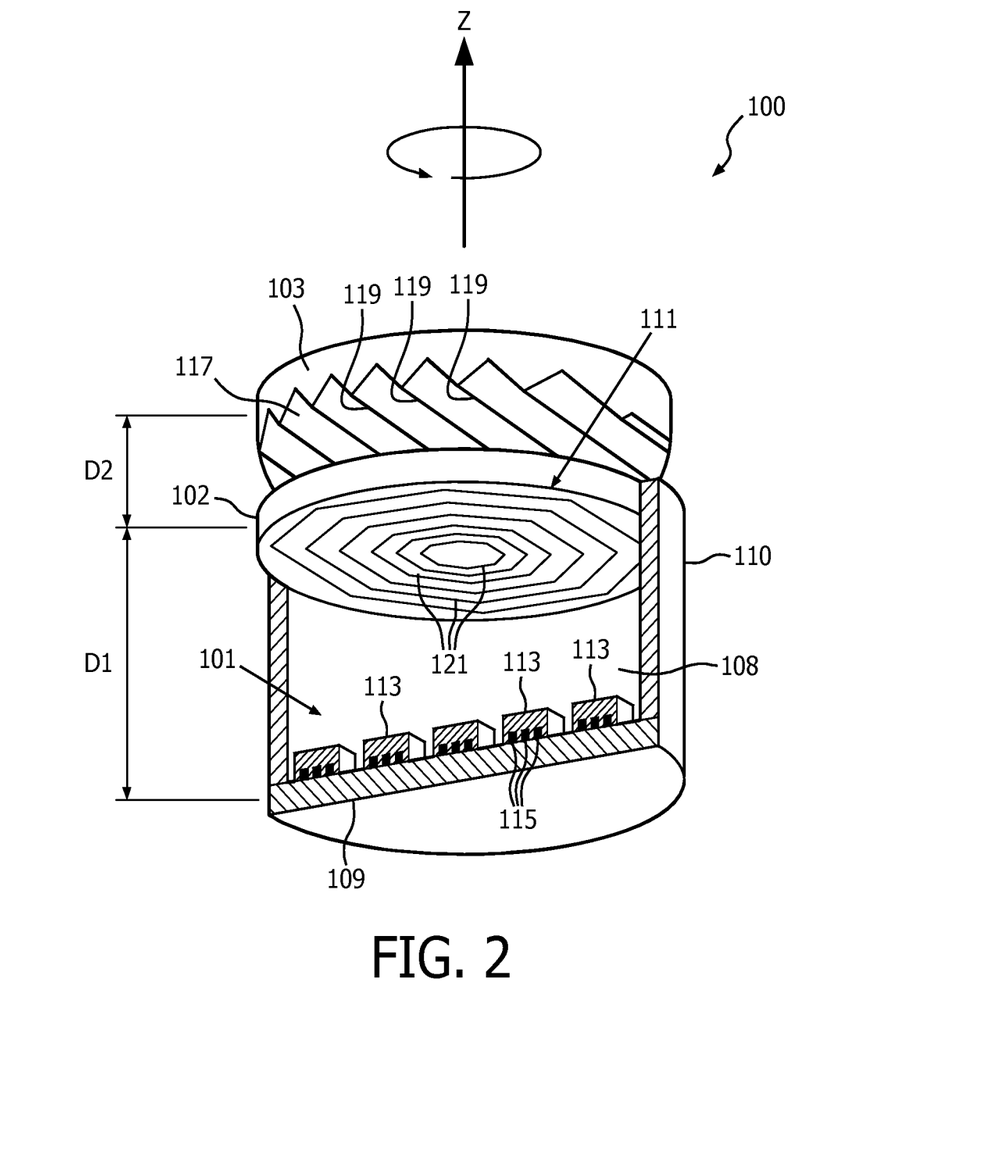
FIG. 2 shows a first embodiment of a lighting device according to the invention.

FIG. 2 shows a first embodiment of a lighting device 100 according to the invention. The lighting device comprises a light source 101, LEDs in the figure, defining a central axis Z, and is mounted on a bottom 109 of a housing 110. The light source comprises at least two mutually independently operable lighting elements 113 of which five are shown in the figure. Each lighting element comprises a collimator (not shown) providing a relatively narrow beam of 30° FWHM or less, for example 10° FWHM, to a fixed deflective member 102. The fixed deflective member 102 is positioned in between the light source and a rotatable deflective member 103, for the sake of clarity, the mutual distances D1 and D2 between the light source, and the deflective members are shown as relatively large, but usually these distance are small, for example about D1 and D2 are in the range of 0.1 mm to 10 mm, for example 1 mm. Each lighting element comprises three LED sources 115, i.e. one red, one blue and one green LED source. The lighting device further comprises a fixed deflective member 102 and fixedly mounted in said housing and centrally on said axis and extending transverse thereto and facing the light source with a main surface 111. The fixed deflective member comprises at least two mutually differently deflective portions 121 on said main surface. In the figure the subdivision of the main surface into about concentric octagonal deflective portions (octagons) is given pure schematically, which octagons each are associated with respective lighting elements. Each deflective portion has unique deflection characteristics. The lighting device further comprises a rotatable deflective member 103 mounted to said housing and rotatable about said axis Z and extending transverse thereto. The rotatable deflective member has main surface 117 facing the fixed deflective member and is provided with parallel extending prismatic ridges 119 of equal shape. The prismatic ridges have one steep side basically parallel to the axis Z, and one active side tilted by an active angle typically in the range of 0° to 40° with respect to the main surface of the rotatable deflective member. Yet the active angle should be less than the critical angle if the prismatic ridges are provided on the main face facing away from the fixed deflective member. Typically the deflective members are made of high refractive index, light transparent material, for example PMMA (polymethylmetacrylate), or PC (poly carbonate), high barium containing glass etc.

Figure 3:
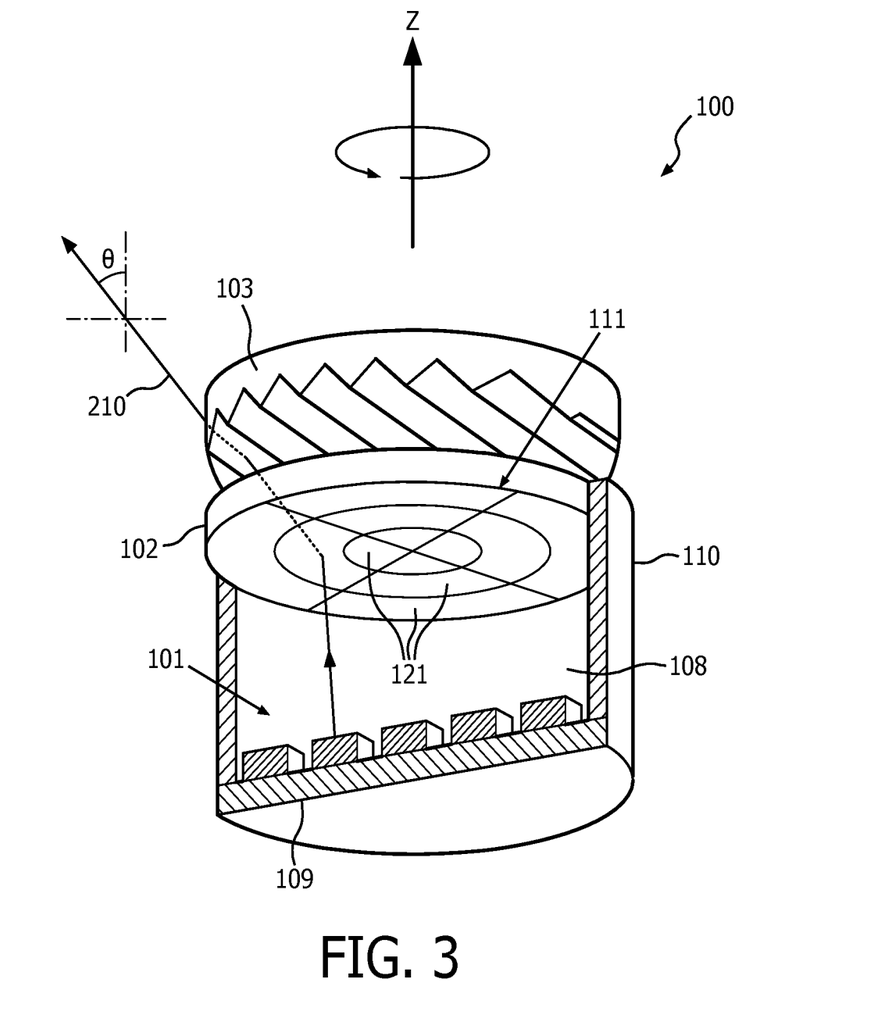
FIG. 3 shows a second embodiment of a lighting device according to the invention.

FIG. 3 shows a second embodiment of a lighting device 100 according to the invention of similar construction as shown in FIG. 2. The fixed deflective member 102 comprises on its main surface 111 concentric rings wherein each ring, except the central one, is built up by four refractive arc segments as deflective portions 121 which are mutually different in deflection. The light source 101 comprises lighting elements 113 which are arranged in the same manner as the deflective portions to form combinations of a lighting element and an associated deflective portion. FIG. 3 further shows the path of a light beam 210, the light beam being first deflected by a deflective portion of the fixed deflective member and subsequently is further deflected by the rotatable deflective member thus to be finally issued at a polar angle Θ with the central axis Z.

Figure 4A:
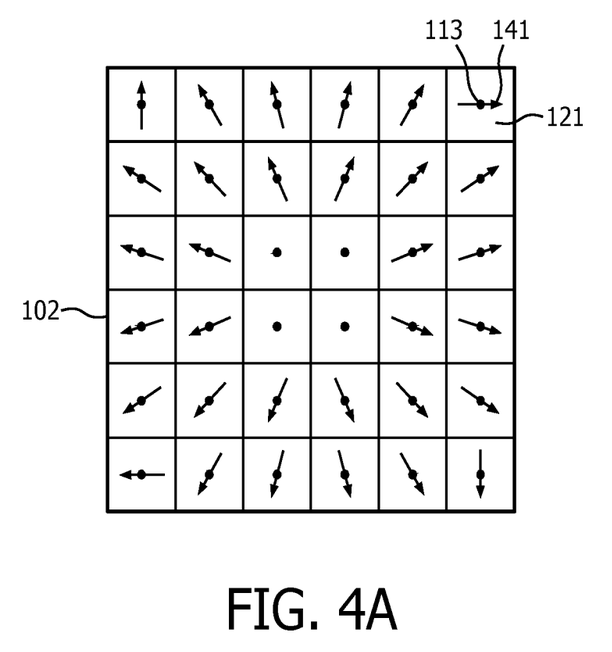
FIG. 4A-B shows a first arrangement of deflective portions on a fixed deflective member together with associated lighting elements and a rotatable deflection member.
Figure 4B:
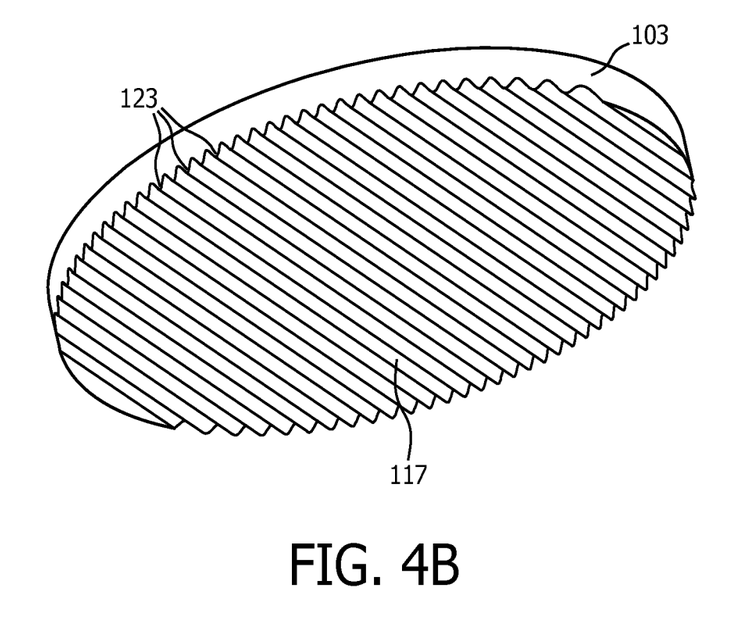

FIG. 4A shows projection along the central axis Z of a first arrangement of deflective portions 121 on a square fixed deflective member 102 together with associated lighting elements 113. The main surface of the fixed deflective member comprises 36 tessellated square shaped deflective portions, the arrows 141 are indicants for the extrusion direction of the prismatic ridges and/or the deflection directions for each one of the deflective portions. The four central squares do not have a prismatically shaped surface and hence do not deflect light. Each deflective portion is associated with a respective one of the 36 lighting elements, in the figure the lighting elements are single white LEDs. FIG. 4B shows a rotatable deflective member 103 having a main surface 117 provided with mutually parallel extending curved grooves 123. The curvature of each groove comprises a steep side more or less parallel to the axis Z, and comprises a curved active side which has a gradually changing active angle in the range of 0° to 40° with the main surface and which causes a variable deflection over the curvature of incident light, hence light is redirected or deflected into a target direction as a relatively broad light beam.

Figure 5A:
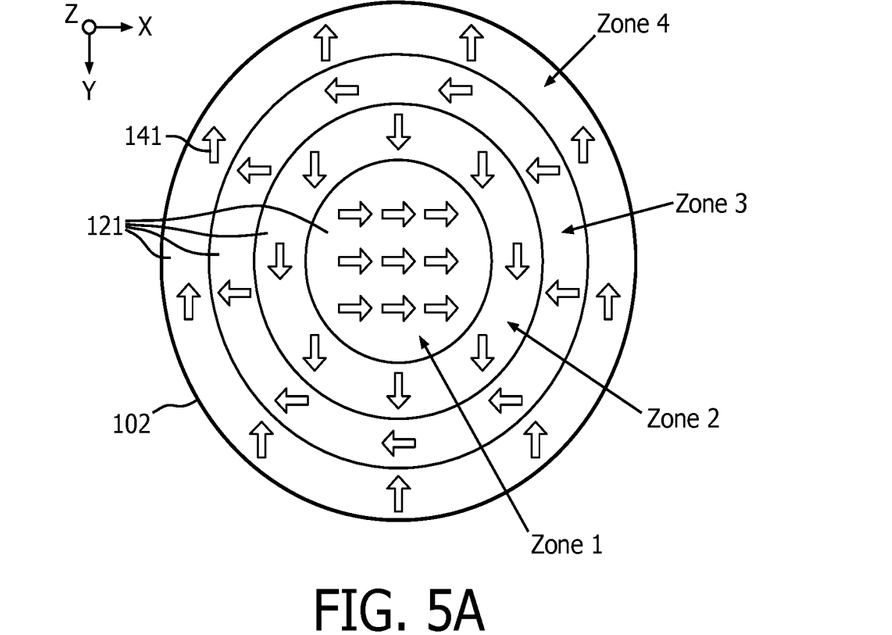
FIG. 5A-C shows a second arrangement of deflective portions on a fixed deflective member, a perspective view in mutual position with respect to a rotatable deflective member, and the dynamic range of a redirected beam.
Figure 5B:
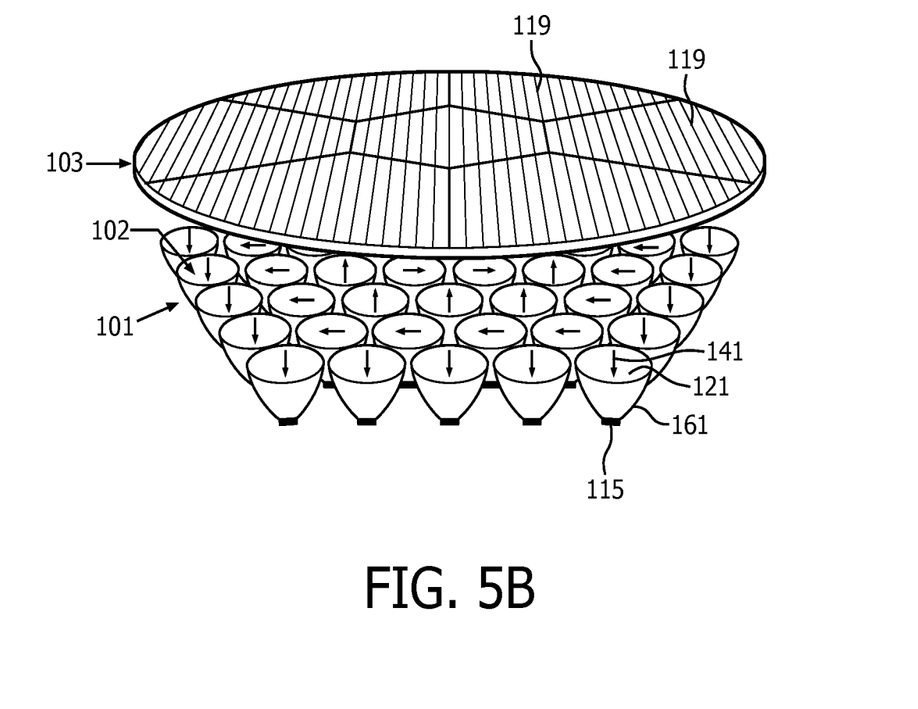
Figure 5C:
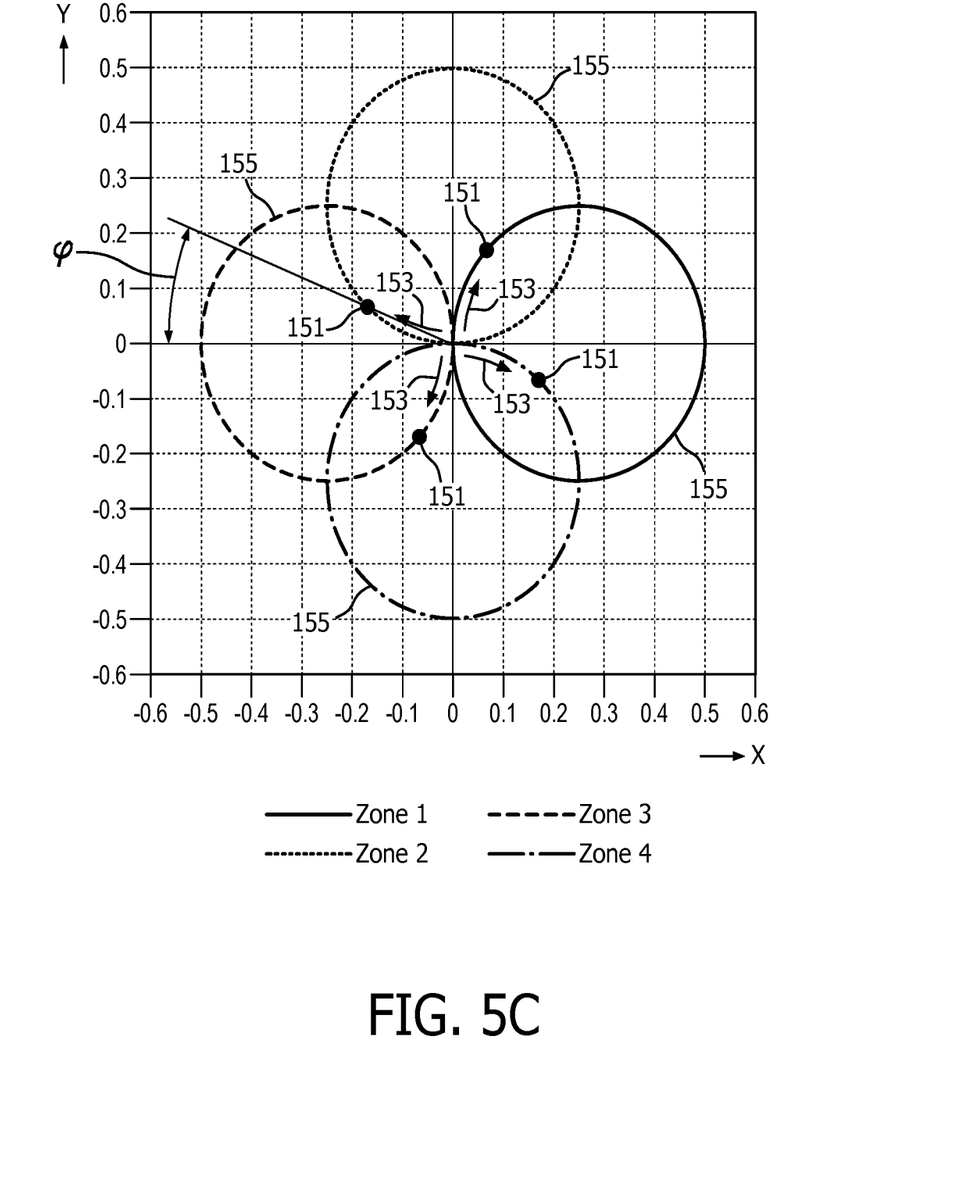

FIG. 5A shows zones of the beam directions as obtained from a second arrangement of deflective portions 121 on a fixed deflective member 102 together with associated lighting elements, FIG. 5B shows a perspective view of the lighting elements comprising collimators with integrated fixed deflective member in mutual position with a rotatable deflective member, and FIG. 5C shows the dynamic range for each of the redirected beams.

In FIG. 5A the beam direction obtained for each zone is indicated by the arrows 141 and as deflection directions projected onto the XY-plane. As shown in FIG. 5A the zones with the same beam direction are concentric rings, which is the result of the fixed deflective member comprising as deflective portions four concentric rings with the same arrangement.

Figure 7:
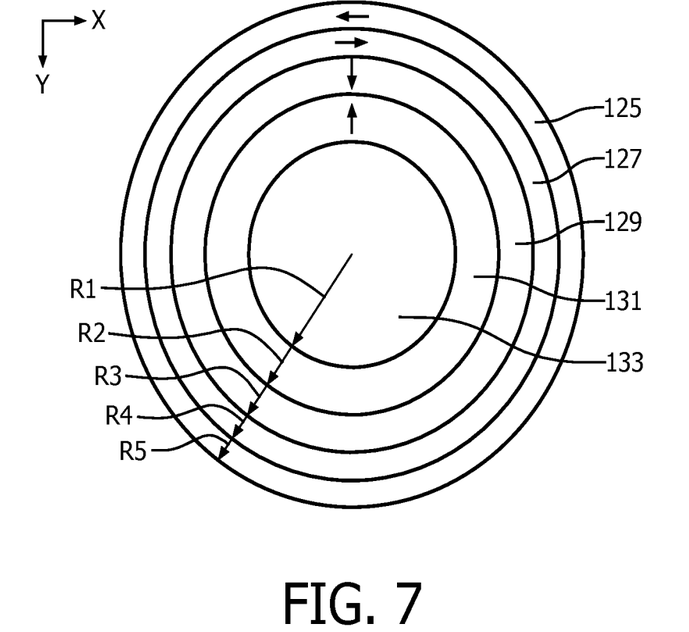
FIG. 7 shows a third arrangement of deflective portions on a fixed deflective member.

FIG. 5B shows a perspective view of an embodiment of the lighting device 100. The lighting device comprises a light source 101, a fixed deflective member 102 and a rotatable deflective member 103 having a prismatically shaped structure of parallel extending prismatic ridges 119 on a main surface 112 facing away from the light source. The light source comprises compactly arranged lighting elements 113. Each lighting element comprises a LED source 115, a collimator 161 and a part of a deflective portion 121 which forms an integrated unit with the collimator and the LED source. The beam deflection direction as obtained from each lighting element is indicated by the arrows 141. As clearly visible in FIG. 5B the number of LED sources associated with a respective deflective portion varies significantly per deflective portion. Switching from illumination of one deflective portion to illumination to another deflective portion might result in the effect of an abrupt decrease or increase in light intensity issued from the lighting device, and is the result of the different size of the deflective portions of the fixed deflective member, because the ring shaped deflective portion have the same width in radial direction. This effect can be counteracted by a balanced dimming/boosting of the LED sources, or by a gradual change in compactness of the arrangement of the LED-sources, but alternatively can be counteracted with a fixed deflective member having concentric rings as shown in FIG. 7, i.e. with concentric rings having the same surface size.

FIG. 5C shows in an XY-plane the projected resulting beam directions, represented as dots 151, as obtained from the lighting device, i.e. including the rotatable deflective member. The fixed deflective member and lighting elements are the same as in FIG. 5A. The circles 155 indicate the path which a respective main direction of a beam follows when rotating the rotatable deflective member from 0° to 360°, φ is the azimuth angle at which the beam is redirected. The beam direction is the vector starting at X,Y=0,0, to a point on the four curves. The dots 151 represent the resulting beam directions for a given prism plate rotation angle and the arrows 153 the direction the beam angles change starting from the center. The shown case represents the case of prisms having a 25° angle measured from the main surface of both of the deflective members and which are made from PMMA and which provide a beam tilt of 12.8°.

Figure 6A:
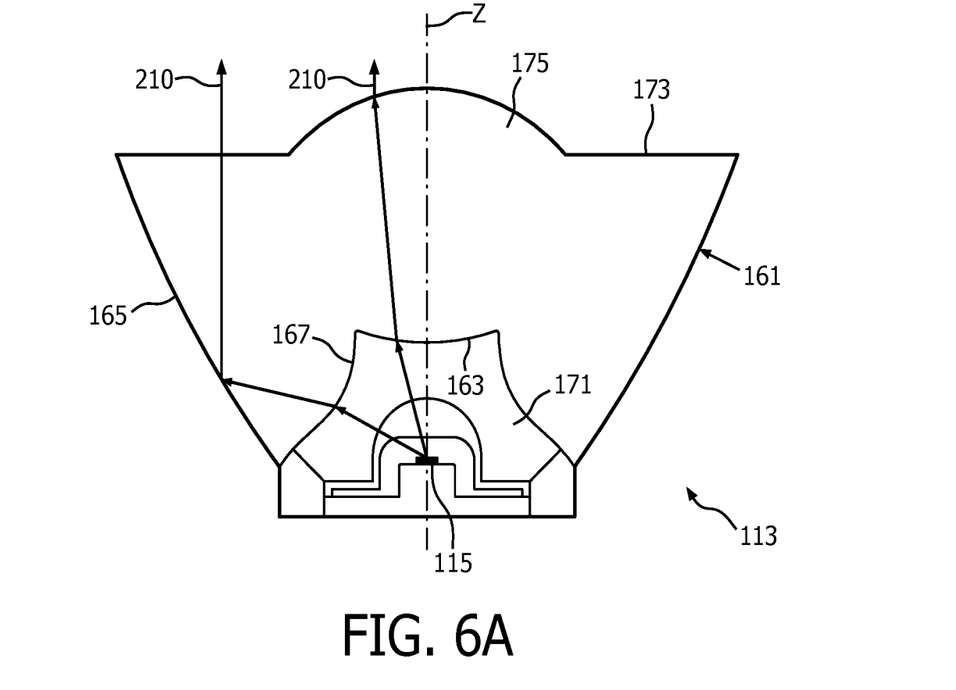
FIG. 6A-B shows two embodiments of a lighting element with integrated collimating element.
Figure 6B:
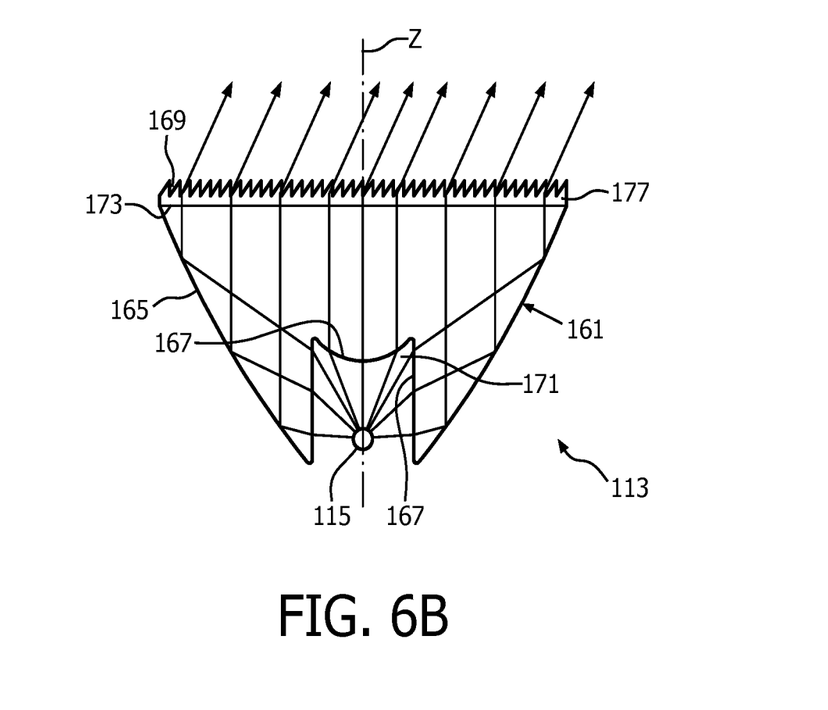

FIG. 6A-B shows two embodiments of a lighting element with integrated collimating element. The lighting element 113 shown in FIG. 6A comprises a LED source 115 and an integrated rotationally symmetrical, bowl-shaped collimator lens 161 which comprises an inner refractive wall 163, an outer reflective wall 165 for TIR, a first inner refractive surface 167 with a recess 171 in which the LED-source is situated and which collimator lens is also provided with a second, top surface 173, which may be planar but in the figure comprises a local, curved portion 175, from which a beam 210 of parallel light rays generated by the LED source emerges in a direction essentially parallel to the central axis Z.

FIG. 6B shows a lighting element 113 comprising a LED source 115 located in recess 171, the lighting element is similar in structure to the lighting element shown in FIG. 6A. However, the lighting element of FIG. 6B further comprises a sawtooth-like structure 169 as deflective portion of the (virtual) fixed deflective member, in the figure provided as a separate foil 177 which is secured to the second surface of the collimator lens. The collimator ensures by the combined effect of refraction at the inner refractive surface 167 and TIR at the outer reflective wall 165 of the collimator, that light rays from the LED-source are issued from the flat top surface 173 in a direction parallel to the central axis Z, which light rays subsequently are deflected over a specific angle at the foil having a prismatically shaped surface/sawtooth structure. The deflected light rays imping on the rotatable deflective member (not shown, but see FIG. 3) for further deflection into the final target direction.

FIG. 7 shows a third arrangement of five concentric rings as deflective portions 121 on a fixed deflective member 102. The concentric rings mutually are of the same surface size. In a sequence from the central axis through the center, the radius of each ring increases according to: $R_1^2=1 \rightarrow R_1=1$, $R_2^2=2 \rightarrow R_2=1.41$, $R_3^2=3 \rightarrow R_3=1.73$, $R_4^2=4 \rightarrow R_4=2$, $R_5^2=5 \rightarrow R_5=2.24$, etc . . . . Each ring can then be provided with equal number of lighting elements so that switching from one group to another does not lead to differences in intensity. Alternatively, this can be attained by different density distribution of lighting elements per ring shaped deflective portion for ring shaped deflection portion which mutually are different in size. The arrows in the four outer rings 125, 127, 129, 131, are the deflection directions projected onto the XY-plane, for a fixed deflective member plate with five zones of concentric rings. The central ring 133 has no deflective structure and is to be matched with a central ring shaped deflective portion on the rotatable deflective member (not shown) which then also can be without a deflective structure, thus an undeflected beam is obtainable by the lighting device as well.

Figure 8:
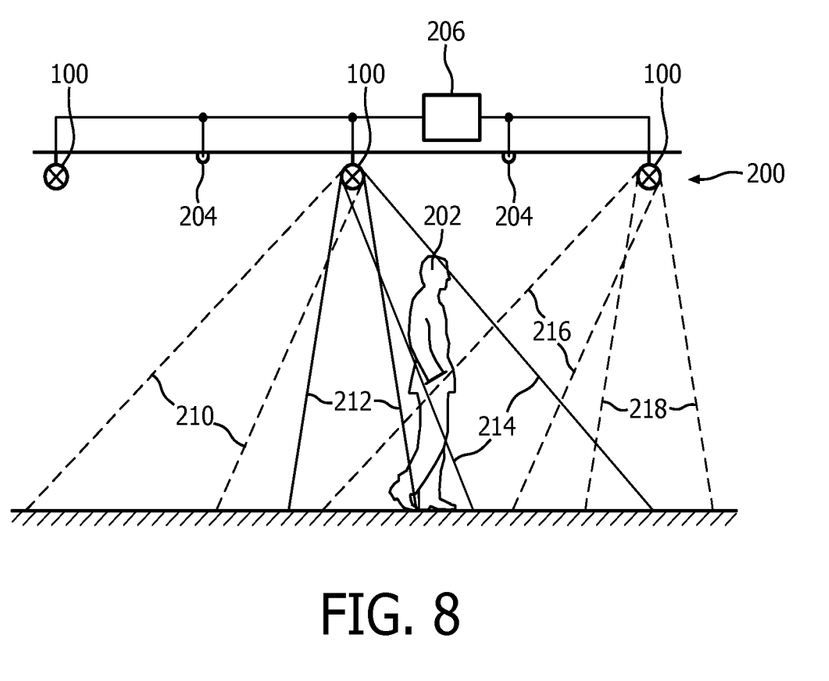
FIG. 8 shows a lighting system with three lighting devices according to the invention.

FIG. 8 shows a lighting system 200 with three lighting devices 100 according to the invention and a preprogrammed control unit 206 for controlled switching/dimming of the lighting devices which control unit is triggered by sensors 204. This selective switching/dimming can be done by a lookup table that needs as input the emission angle for illumination of the target area by the lighting device. The sensors 204 sense the presence and movement (direction) of a person 202 and subsequently provide sensor signals to the control unit which processes these signals and instructs the lighting devices to act accordingly. In the figure the person has already long past the left lighting device, which therefore is switched off. The person is just past the center lighting device which still issues three beams 210,212,214 generated by three of its combinations of lighting elements and associated deflective portions, the combination generating a light beam towards the left 210 as already dimmed, the other two beams 212,214 (still) operating in the full mode (undimmed). The right lighting device anticipates the oncoming person and thereto already two light beams 216, 218 are switched on in the dimmed mode, not fully undimmed as this might blind the person. The rotatable deflective member enables easy illumination of the path of the person, even if the path followed by the person is curved.

The invention claimed is:

1. Lighting device comprising:
   a light source comprising at least two mutually independently operable lighting elements arranged around a central axis;
   a fixed deflective member fixedly mounted on said axis and facing the light source, wherein a main surface of the fixed deflective member includes at least two deflective portions which mutually are different in deflection structure and/or orientation of the deflection structure and which each are associated with a respective lighting element;
   a rotatable deflective member rotatably mounted about said axis and facing the fixed deflective member;
   wherein the fixed deflective member is positioned in between the light source and the rotatable deflective member, wherein the at least two deflective portions includes concentric ring shaped deflective portions and each lighting element is associated with one of the concentric ring shaped deflective portions; and
   wherein the lighting elements and associated concentric ring shaped deflective portions are controlled to provide a predetermined light pattern.

2. Lighting system comprising at least one lighting device as claimed in claim 1, characterized in that comprises a control unit for controlling at least the operable lighting elements.

3. Lighting system as claimed in claim 2, characterized in that it further comprises drive means for rotating the rotatable deflective member, said drive means is a motor controlled by the control unit.

4. Lighting system as claimed in claim 2, characterized in that it further comprises a sensor for providing a sensor signal to the control unit.

5. Lighting system as claimed in claim 2, characterized in that it comprises at least two lighting devices, the at least two lighting devices are controlled by the control unit for mutual cooperation.

6. Lighting device as claimed in claim 1, characterized in that the at least two of the lighting elements are simultaneously operable.

7. Lighting device as claimed in claim 1, characterized in that the fixed deflective member is a single piece extending over all the lighting elements.

8. Lighting device as claimed in claim 1, characterized in that the deflective members each are refractive members and preferably each member comprise a prismatically shaped main surface.

9. Lighting device as claimed in claim 1, characterized in that light which incidents parallel to the axis on the fixed deflective member is redirected into a unique direction by a respective deflective portion.

10. Lighting device as claimed in claim 1, characterized in that for all the ring shaped deflective portions, the number of lighting elements associated per ring shaped deflective portion is essentially constant.

11. Lighting device as claimed in claim 1, characterized in that, the ring shaped portions have an equal surface area.

12. Lighting device as claimed in claim 1, characterized in that each ring has a unique deflection which is the same over the whole ring.

13. Lighting device as claimed in claim 1, characterized in that each ring is built up by deflective arc segments which are mutually different in deflection.

14. Lighting device as claimed in claim 1, characterized in that in radial direction the degree of deflection for an elevation angle by the fixed deflective member either gradually increases or decreases.

15. Lighting device as claimed claim 1, characterized in that the rotatably deflective member is a round disk with a diameter that is equal or larger than the diameter of the disk shaped fixed deflective member.

* * * * *